(12) United States Patent
Humble et al.

(10) Patent No.: US 6,644,911 B2
(45) Date of Patent: Nov. 11, 2003

(54) LUMBER STACKING APPARATUS

(76) Inventors: Erik L. Humble, P.O. Box 53, Otis Orchards, WA (US) 99027; Charles W. Moles, 24902 E. Roxanne, Newman Lake, WA (US) 99025

( * ) Notice: Subject to any disclaimer, the term of this patent is extended or adjusted under 35 U.S.C. 154(b) by 0 days.

(21) Appl. No.: 10/087,129

(22) Filed: Feb. 27, 2002

(65) Prior Publication Data

US 2003/0161713 A1 Aug. 28, 2003

(51) Int. Cl.[7] ............................................. B65G 57/18
(52) U.S. Cl. ................... 414/789.5; 414/794.3
(58) Field of Search ............... 414/789.5, 793.4, 414/794.3

(56) References Cited

U.S. PATENT DOCUMENTS

| | | |
|---|---|---|
| 4,057,150 A | 11/1977 | Lunden |
| 4,253,787 A | 3/1981 | Lunden et al. |
| 4,324,521 A | 4/1982 | Lunden et al. |
| 4,330,055 A | 5/1982 | Lunden |
| 5,720,592 A | 2/1998 | Gillingham et al. |
| 5,921,740 A * | 7/1999 | Stewart ...................... 414/399 |
| 6,007,295 A * | 12/1999 | Sears et al. .............. 414/789.5 |
| 6,048,164 A * | 4/2000 | Ritola ...................... 414/789.5 |
| 6,238,174 B1 * | 5/2001 | Faerber ................... 414/789.5 |

* cited by examiner

*Primary Examiner*—Janice L. Krizek
(74) *Attorney, Agent, or Firm*—Reidlaw, L.L.C.; Thomas Olson; John S. Reid

(57) ABSTRACT

Lumber stacking apparatus which include sticker placing apparatus provide means of automatically placing stickers in a sticker tray and of removing stickers from a sticker tray. Lumber placing apparatus includes an actuating assembly that can be actuated to move a sticker support bracket that is operatively supported thereby in a substantially vertical direction and in a substantially horizontal direction during transferal, by the sticker support bracket, of a sticker from a sticker in-feed conveyor to a sticker tray.

2 Claims, 9 Drawing Sheets

LUMBER STACKING APPARATUS

FIELD OF THE INVENTION

The invention claimed and disclosed herein pertains to lumber stacking apparatus and more specifically, to the placement of stickers upon, and removal of stickers from, lumber stacking apparatus.

BACKGROUND OF THE INVENTION

The practice of placing milled lumber pieces, or boards, into orderly stacks of predetermined sizes has long been known to facilitate storage, transportation, and handling of the lumber. Further, the stacking of lumber pieces in certain manners is known to enhance various lumber processing operations such as lumber drying and curing and the like. Specifically, the stacking of lumber pieces, wherein the pieces are spaced apart from one another within the stack to allow for air circulation between the lumber pieces, is known to promote efficiency of lumber drying operations, and especially of operations wherein drying kilns are employed.

In relatively recent times, automatic lumber stacking apparatus have been developed to increase production capacity and efficiency, as well as to avoid the tedium and safety risk associated with the manual stacking of lumber pieces. The general nature of a typical prior art lumber stacking apparatus can be easily understood by an examination of U.S. Pat. No. 4,057,150 to Lunden. As a study of the '150 patent reveals, the operation of a typical prior art automatic lumber stacking apparatus can be generally described as in the following paragraphs in conjunction with the FIG. 1 of the subject patent.

Referring to FIG. 1 of the '150 patent, the lumber pieces 12 to be stacked are brought into the lumber stacking apparatus 10 on a lumber in-feed conveyance means 25. The lumber in-feed conveyance means 25 can have any of a number of acceptable and known forms, including a dragchain conveyor, for example. The lumber pieces 12 are staged and accumulated in a single-layer course at a pickup station 15 to await transfer from the pickup station 15 to a stacking station 18 where a lumber stack 16 is formed.

A fork assembly 51 lifts the accumulated course of lumber pieces 12 from the lumber conveyance means 25 at the pickup station 15 and moves the course of lumber pieces to a stacking station 18, where the course is deposited on a hoist platform 17. The course of lumber pieces 12 is typically removed from the fork assembly 51 by way of a stationery rake-off device (not shown) which is synchronously deployed relative to the movement of the fork assembly, the result of which is to strip the course off of the fork assembly as the fork assembly moves away from the stacking station 18 and back toward the pickup station 15. The prior art rake-off device will be described in further detail in later discussion.

The above-described process of moving the lumber pieces 12 from the pickup station 15 to the stacking station 18, wherein successive courses of lumber pieces 12 are placed one upon the other by the fork assembly 51, is repeated as often as necessary to form a lumber stack 16 of desired size on the hoist platform 17. The hoist platform 17 is generally configured to move the stack 16 incrementally downward in synchronous correspondence with placement of each successive lumber course thereupon so as to maintain the top surface of the stack at a substantially constant elevation relative to the path of the fork assembly 51. Upon formation of a lumber stack, the completed stack is removed from the hoist platform 17, and formation of a new stack is commenced thereupon.

As mentioned briefly above, it can be desirable to cause successive courses within a given lumber stack to be spaced apart from one another in order to promote drying processes and the like. Such spacing of successive courses of lumber within a given lumber stack is typically accomplished by placing spacers between the lumber courses that are to be spaced apart. The spacers are often in the form of relatively small lumber strips that are referred to in the art as "stickers." While the placement of stickers during the formation of a lumber stack can be accomplished manually, it is obviously desirable to perform sticker placement automatically in conjunction with the operation of an automatic lumber stacking apparatus.

Accordingly, some prior art lumber stacking apparatus incorporate automatic sticker placers that operate in conjunction therewith to automatically form a lumber stack having spaced apart courses. Prior art sticker placers of a variety of configurations have been developed. The U.S. Pat. No. 4,253,787 to Lunden discloses at least two types of sticker placers. One type of prior art sticker placer can be understood by an examination of FIGS. 6, 7, 8, and 9 of the '787 patent. With reference thereto, a sticker in-feed conveyance means 73 is employed which can be in the form of an endless lug chain conveyor as depicted. Such a lug chain conveyor typically comprises a plurality of lugs which are spaced at predetermined intervals, the purpose of which is to facilitate control of the location of the stickers 15 on the sticker in-feed conveyance means 73.

Stickers 15 are moved from a sticker hopper (not referenced) or the like and into the pickup area (not referenced) and underneath the fork assembly 24 by way of the sticker in-feed conveyance means 73. The path of movement of the stickers 15 on the sticker in-feed conveyance means 73 is generally transverse with respect to the operational path of movement of the fork assembly 24 as well as to the movement of the lumber pieces 12 on the lumber in-feed conveyance means 18. The fork assembly 24 includes a plurality of individual fork arms 25. Each of the fork arms 25 has at least one sticker tray 84 attached thereto on which a sticker is to be placed.

A sticker transfer means 80 is employed to transfer stickers from the sticker in-feed conveyance means 73 to the sticker trays 84, wherein one sticker is placed in each of the sticker trays. The sticker transfer means 80 includes a number of frame members 87, 88 that are connected to one another in a rigid manner. The sticker transfer means 80 also includes several pairs of flat support brackets 86 that are rigidly connected to the frame members 87, and are configured to contact a corresponding sticker 15 and lift the sticker off of the sticker in-feed conveyance means 73 in response to movement of the frame members 87, 88 in an upward direction relative to the sticker in-feed conveyance means.

After the stickers 15 are lifted off of the sticker in-feed conveyance means 73 by the sticker support brackets 86, the stickers are held in a stationary position until the upward movement of the fork assembly 24 causes the corresponding sticker tray 84 to contact the respective sticker and to lift the sticker from the support brackets. After lifting the sticker 15 from the sticker transfer means 80, the fork assembly 24 then moves upwardly to contact the lumber pieces 12 which are staged thereabove upon the lumber in-feed conveyance means 18. The stickers 15 are thereby sandwiched between the respective sticker tray 84 and the lumber pieces 12 as the lumber pieces are lifted off of the lumber in-feed conveyance means 18 by upwardly movement of the fork assembly 24. The course of lumber pieces 12 is then placed upon a previously formed course of lumber pieces along with the stickers 15 which are located there between.

The sticker transfer means 80 functions by way of the frame members 87, 88 are caused to move along an arcuate path by way of a plurality of bellcranks 90 which are pivotally connected to the frame members 88 and to a shaft 89 that is rotationally supported on a framework 18. The shaft 89, in turn, is rigidly connected to a primary bellcrank 91 which is pivotally connected to a linkage 92 that is operatively supported on the framework 18. At least two shafts 89 are employed in the manner shown, wherein the shafts, together with the frame members 87. 88 and associated bellcranks 90 operate in the manner of a parallelogram four-bar-linkage.

The linkage 92 can be actuated by any of a number of actuating means, such as by way of the cam surface 94 and respective cam follower 93 as shown. However, as explained in the '787 patent, the linkage 92 is preferably actuated by a fork assembly actuating means (not referenced) so as to maintain synchronicity of movement with respect to the sticker transfer means 80 and the fork assembly 24. That is, by configuring the linkage 92 and the fork assembly 24 to be actuated by a common actuating means, the operation of the sticker transfer means 80 is synchronized with that of the fork assembly 24.

Another prior art form of sticker placer which is disclosed in the '787 patent can be understood by a close examination of FIGS. 10, 11, 12, 13, and 14. As shown in those figures, the sticker placer disclosed thereby includes a sticker in-feed conveyance means 73 as well as a sticker transfer means 80. While the sticker in-feed conveyance means 73 can be identical, or at least substantially similar, to that of the sticker placer described immediately above, the sticker transfer means 80 which is shown in FIGS. 10 through 14 of the '787 patent is substantially dissimilar to that of the sticker placer described immediately above.

As is seen in FIGS. 10 through 14 of the '787 patent, the sticker transfer means 80 shown therein comprises a pair of elongated, endless conveyer members 190 that are arranged so as to operate in a substantially convoluted, serpentine circuitous path. Additionally, the sticker transfer means 80 includes a series of substantially flat support brackets 86 which are connected a regular, predetermined intervals to a respective conveyor member 190. Each of the conveyor members 190 can be circulated about its respective path by way of a drive means 194.

As is seen, the path of each respective conveyor member 190 is established by way of various guide and drive sprockets 200, 201, 203, which are operatively located at precisely determined stationary positions relative to the fork assembly 24. The movement, along the respective circuitous paths, of the conveyor members 190 causes the respective support brackets 86 attached thereto to thereby contact and lift the stickers 15 off of the sticker in-feed conveyor means 73 and then to deposit the stickers upon the respective sticker trays 84 which are connected to each respective fork arm of the fork assembly 24. In this manner, the stickers 15 are moved from the sticker in-feed conveyance means 73 to the respective sticker trays 84, from whence the stickers are placed between successive courses of lumber pieces in conjunction with the formation of a stack of lumber.

Yet another form of sticker placer is disclosed by U.S. Pat. No. 4,324,521 to Lunden. The sticker placer of the '521 patent can be understood by a study of FIGS. 3, 4, 5, 6, and 7 thereof. With reference now to FIG. 3 of the '521 patent, the stickers 14 are brought into proximity with the respective fork arms 25 of a stacking apparatus by way of the sticker in-feed conveyance means 16. The sticker in-feed conveyance means 16 can be operatively supported on a stationary frame 15. The frame 15 comprises a vertical flange (not referenced) as well as a horizontal flange 47.

A series of rollers 29 as well as a series of pivots 44 are also each operatively supported on the frame 15. A carriage 28 is operatively disposed upon the series of rollers 29 so as to be movable along a horizontal path which is substantially parallel to the both the frame 15 and the sticker in-feed conveyance means 16. An actuating means (not shown) is employed to move the carriage 28 in a reciprocating motion while supported on the series of rollers 29. A sticker tray 27 is mounted on each fork arm 25, and is configured to receive and support a sticker 14.

A series of pivot shafts 38 are rotationally supported on the carriage 28 so as to pivot with respect thereto. A pair of spaced sticker support arms 40, as well as at least one crank arm 50, are rigidly connected to each pivot shaft 38. A cam roller 49 is rotationally mounted on one end of the crank arm 50 and is configured to be supported on the horizontal flange 47 of the frame 15, and to roll there along during movement of the carriage 28 with respect to the frame. A ramp 43 is rigidly connected to each pivot 44 so as to be pivotable along therewith relative to the frame 15. The cam roller 49 and the ramp 43 are positioned relative to one another, wherein movement of the carriage 28 causes the cam roller to move toward the ramp and to engage the ramp, whereupon the cam roller is caused to roll upwardly upon the inclined surface 45 provided by the ramp.

The FIGS. 4 through 7 of the '521 patent depict an operational sequence of the sticker placer disclosed thereby. As shown in FIG. 4 of the '521 patent, the cam roller 49 is supported upon the horizontal flange 47 of the frame 15. A sticker (not referenced) is shown to be supported on the sticker in-feed conveyance means 16. The fork arm 25 and associated sticker tray 27 are also shown to be positioned above the sticker in-feed conveyance means 16. The carriage 28 is poised so as to be moved horizontally to the right, whereby the cam roller 49 will be caused to move toward the ramp 43.

Moving now to FIG. 5 of the '521 patent, it is seen that the carriage 28 has moved to the right, whereby the cam roller 49 has been caused to roll upwardly upon the inclined surface 45 of the ramp 43. Moreover, the cam roller 49 has moved past the pivot 44, and has begun to move downwardly upon the declined surface 51 of the ramp 43. As is further seen, the rightward movement of the carriage 28, and the resulting movement of the cam roller 49 upon the ramp 43 has caused the sticker support arm 40 to pivot in a clockwise direction, whereby the sticker 14 has been contacted and lifted upwardly thereby from the sticker in-feed conveyance means 16.

As depicted, the support arm 40 is poised to deposit the sticker 14 upon the sticker tray 27 with further rightward movement of the carriage 28. That is, further rightward movement of the carriage 28 will cause the cam roller 49 to drop off the end of the ramp 43 so as to come to rest upon the horizontal flange 47 of the fame 15, in turn resulting in counterclockwise rotation of the support arm 40. Such counterclockwise rotation of the support arm 40, along with the continued rightward movement of the carriage 28 will cause the sticker 14 to be deposited into the sticker tray 27 as the cam roller 49 continues downward to come to rest upon the horizontal flange 47 of the frame 15.

With reference now to FIG. 6 of the '521 patent, the cam roller 49 is depicted as having dropped from the ramp 43 so as to come to rest upon the horizontal flange 47 of the frame 15. The carriage 28 is now poised to move leftward on a return leg of its reciprocating cycle of movement. As is seen, during such leftward movement of the carriage 28 relative to the frame 15, the cam roller 49 will be caused to roll upon the horizontal flange 47 of the frame.

Moving now to FIG. 7 of the '521 patent, the purpose of the pivotal nature of the ramp 43 and pivot 44 is apparent. That is, as the leftward movement of the carriage 28 continues, the cam roller 49 contacts the lower surface 46 of the ramp 43 so as to cause the ramp to pivot in a clockwise direction about the pivot 44. The cam roller 49 thereby passes beneath the ramp 43 by pushing the ramp upward. As the leftward movement of the carriage 28 continues, the cam roller 49 passes the end 52 of the ramp 43, whereupon the ramp reverses its movement and pivots in a counterclockwise direction under the force of gravity so as to return to a rest position, wherein the end is in contact with the horizontal flange 47 of the frame 15. The carriage 28 continues its leftward movement until it achieves the relative position depicted in FIG. 4, from whence the cycle described above is repeated to place another sticker 14 into the sticker tray 27.

Still another form of sticker placer is disclosed by U.S. Pat. No. 5,720,592 to Gillingham et al. The sticker placer of the '592 patent can be understood by an examination of FIGS. 8 and 9 thereof. As depicted in FIGS. 8 and 9, the stickers 73 are brought into proximity with the fork arms 32 by way of the sticker in-feed conveyance means 21. A respective sticker tray 22 is pivotally connected to each fork arm 32 by way of a respective hinge 93. A respective pivot arm 98 is rigidly connected to each sticker tray 22. A linkage 100 is operatively connected to each pivot arm 98, as well as to an actuator 103, wherein actuation of the actuator causes pivoting of the sticker trays 22 by way of the linkage and respective pivot arm.

Thus, when the respective stickers 73 have approached to within a given proximity of the corresponding sticker tray 22, a first actuation of the actuator 103 causes the sticker trays to pivot downward. The movement of the sticker in-feed conveyance means 21 continues so as to position the respective stickers 73 substantially above the corresponding sticker trays, wherein a second actuation of the actuator 103 opposite the first actuation causes the sticker trays to pivot upward, whereby, together with upward motion of the fork arms 32, the respective stickers are cradled within the corresponding sticker tray and lifted upwardly from the sticker in-feed conveyance means.

As mentioned briefly above, a rake-off, or stripping, device is typically employed in conjunction with prior art stacking apparatus to facilitate transfer of lumber pieces from the fork assembly to the stack. Returning now to the '787 patent, a typical rake-off device is disclosed therein. The rake-off device of the '787 patent can be understood from an examination of FIGS. 3, 4, and 5. Referring to FIGS. 3, 4, and 5 of the '787 patent, the rake-off device 56 typically includes at least one cross bar 61 that is oriented transversally relative to the fork arms 24 of the fork assembly 25. The cross bar 61 is typically suspended from overhead by way of a chain 63. The movement of the cross bar 61 is typically restricted to a substantially vertical path.

The chain 63 is typically employed to control the movement of the cross bar 61, wherein the cross bar is selectively moved between a lower stripping position and an upper clear position in synchronization with the movement of the fork assembly 25. That is, as the fork assembly 25 moves the lumber pieces 12 from the pickup station (not shown) to the stacking station (not shown), the cross bar 61 remains in the clear position, wherein the lumber pieces and fork assembly pass unheeded beneath the cross bar. However, when the fork assembly 25 reaches its fully extended position above the stack at the stacking station, the cross bar 61 is typically deployed by lowering from the clear position into the stripping position.

When deployed in the stripping position, the cross bar 61, by way of a plurality of spaced stripping surfaces 68 attached thereto, prevents further movement of the lumber pieces 12 while the fork assembly 25 moves back toward the pickup station. That is, the cross bar 61, while suspended by the chain 63, is lowered into the stripping position after the fork assembly 25 and the lumber pieces 12 have reached the stacking station, but before the fork assembly returns to the pickup station.

The cross bar 61 and associated stripping surfaces 68, while in the stripping position, are strategically located relative to the fork arms 24 such that the fork arms can pass freely back to the pickup station, while the lumber pieces 12 are prevented, by way of contact with the stripping surfaces, from movement toward the pickup station. In this manner, the lumber pieces 12 are raked, or stripped, from the fork arms 24 as the result of the withdrawal of the fork assembly 25 from the stacking station. The course of lumber pieces 12 is thus deposited at the stacking station to form a stack of lumber pieces.

The stickers (not shown) are typically raked, or stripped, from the associated sticker trays in a similar manner. That is, the rake-off device is deployed between strokes of the fork assembly so as to contact the stickers and thereby rake the stickers from the sticker trays as the fork arms and sticker trays are withdrawn from the stacking station on the return stroke of the fork assembly.

Although prior art sticker placers and rake-off devices such as those described above have been known to perform satisfactorily, it can be appreciated that certain disadvantages can be associated with the configurations thereof. Specifically, the complex design and high parts-count of the prior art sticker placers can result in expenditures of excessive quantities of resources toward the resolution of maintenance and repair issues. For example, a tolerance buildup due to degradation and wear of interconnected components of a typical prior art sticker placer can lead to unacceptable performance which can be remedied only by extensive overhaul and rework of the components.

Furthermore, the form and configuration of the prior art sticker placers can tend to limit the usefulness thereof. For example, the prior art sticker placers are generally not capable of removing stickers from the sticker trays once the stickers are deposited in the trays. This can prove disadvantageous in the event that the stickers must be removed from the trays. Removal of stickers from sticker trays in prior art apparatus typically requires that the entire stacking apparatus and associated components be shut down and that a safety lockout of the apparatus be performed in preparation for manual removal of the stickers.

As another example of the limiting nature of the prior art sticker placer configurations, the stroke of movement of the prior art configurations is generally limited, thus limiting the depth of the fork arms with which the sticker placer can be employed. That is, as stacking apparatus increase in size and capacity, the depth of the fork arms is generally required to increase.

Such an increase in the depth of the fork arms requires that the stickers be lifted a greater distance from the sticker in-feed conveyance means to the sticker trays. However, due to the prior art sticker placer configurations are limited with respect to the stroke of movement, and thus the distance of which the stickers can be lifted from the sticker in-feed conveyance means.

Moreover, disadvantages can be similarly associated with the configurations of prior art rake-off devices. Specifically, the configuration of such prior art rake-off devices limits the precision and speed with which the rake-off device can be positioned relative to the fork arm and sticker trays, thus limiting the overall operational speed and efficiency of the associated stacking apparatus.

What is needed then are information system methods and apparatus which achieve the benefits to be derived from similar prior art methods and/or devices, but which avoid the shortcomings and detriments individually associated therewith.

SUMMARY OF THE INVENTION

The instant invention provides for lumber stacking apparatus, and portions thereof, having novel sticker-handling capacity. In particular, the present invention includes a lumber stacking apparatus having an improved sticker placing apparatus and an improved rake-off device. The sticker placing apparatus of the present invention includes an actuating assembly that is capable of selectively moving the sticker in a substantially vertical direction as well as in a substantially horizontal direction during transferal of the sticker from a sticker in-feed conveyor to a sticker tray located on a fork arm.

The sticker placing apparatus of the present invention also includes a sticker support bracket to be used in conjunction with the actuating assembly, wherein the sticker support bracket defines a cradle area for supporting at least a portion of the sticker during transfer thereof. The cradle area is preferably three-sided, having a substantially flat and horizontal sticker support surface located between to substantially upright horns which extend substantially longitudinally upward from the support surface.

The rake-off device of the present invention includes a cross bar having a roller operatively supported thereon. The roller is configured to come into contact and roll upon an upper surface of an associated fork arm to facilitate the provision of substantial vertical alignment and guidance of the rake-off device during stripping of the sticker from the sticker tray.

These and other aspects and embodiments of the present invention will now be described in detail with reference to the accompanying drawings, wherein:

DETAILED DESCRIPTION OF THE INVENTION

Figure 1:
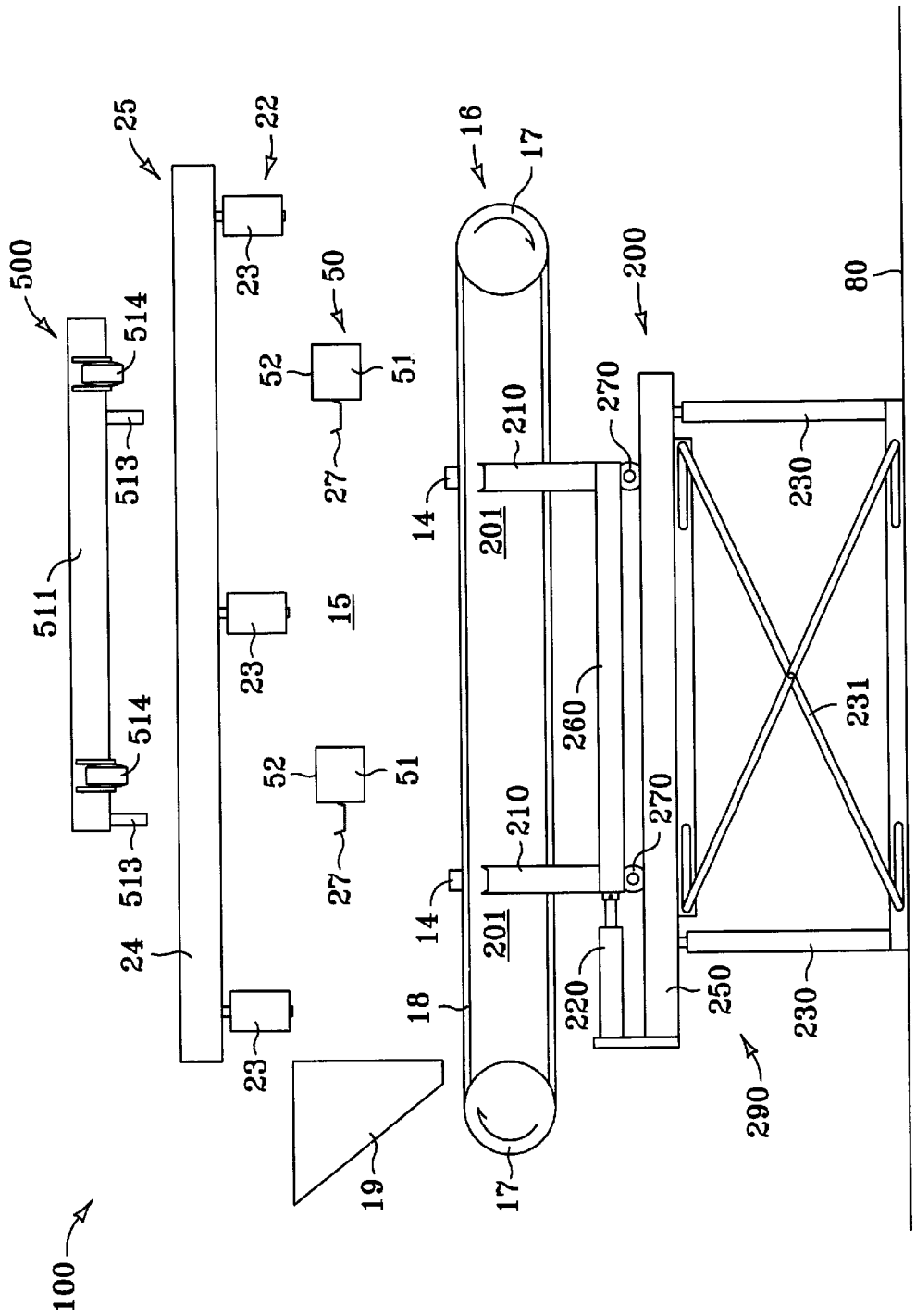
FIG. 1 is a schematic side elevation view in which a lumber stacking apparatus is depicted in accordance with one embodiment of the present invention, wherein a sticker support bracket is shown in a first position.

Apparatus in accordance with the instant invention include various means of automatically handling stickers in conjunction with the automatic stacking of lumber in an automatic lumber stacking apparatus. In accordance with one embodiment of the present invention, a lumber stacking apparatus includes a sticker support bracket and an actuating assembly by which the sticker support bracket is supported. The actuating assembly is configured to move the sticker support bracket in a manner wherein the sticker support bracket lifts at least a portion of a sticker from a sticker in-feed conveyor to a sticker tray whereon the sticker is placed. The actuating assembly is capable of moving the sticker support bracket selectively in a substantially vertical direction as well as a substantially horizontal direction during transferal by the sticker support bracket of the sticker from the sticker in-feed conveyor to the sticker tray.

In accordance with another embodiment of the present invention, a sticker placing apparatus for use with a lumber stacking apparatus includes a base, a vertical actuating mechanism supported by the base, and a support member connected to the vertical actuating mechanism, whereby the support member can be moved in a substantially vertical direction. The apparatus also includes a carriage member movably supported on the support member so as to be movable in a substantially horizontal direction. A horizontal actuating mechanism is also included in the apparatus, and is connected to the carriage member to move the carriage member relative to the support member. A sticker support bracket is supported by the carriage member so that selective actuation of both the horizontal actuating mechanism and the vertical actuating mechanism can cause the sticker support bracket to contact and move at least a portion of a sticker from a sticker in-feed conveyor to a sticker tray.

In accordance with yet another embodiment of the present invention, a sticker placing apparatus for use with a lumber stacking apparatus also includes a base, a carriage member, a horizontal actuating mechanism, a vertical actuating mechanism, and a sticker support bracket. However, the carriage member is supported by the base and the horizontal actuating mechanism is connected to the carriage member to move the carriage member in a substantially horizontal direction relative to the base. Moreover, the vertical actuating mechanism is supported by the carriage member and the sticker support bracket is supported by the vertical actuating mechanism. In this manner, the sticker support bracket can be caused to move in a substantially vertical direction and in a substantially horizontal direction while contacting and transferring a sticker from a sticker in-feed conveyor to a sticker tray.

In accordance with yet another embodiment of the present invention, which has a slightly different configuration of the embodiment which is described immediately above, a sticker placing apparatus has a base, a carriage member movably supported by the base, a horizontal actuating mechanism connected to the carriage member and configured to move the carriage member in a substantially horizontal direction relative to the base, a plurality of vertical actuating mechanisms supported by the carriage member, and a plurality of sticker support members, wherein each sticker support member is supported by an associated vertical actuating member in exclusive one-to-one correspondence.

Each of the vertical actuating mechanisms can be individually selectively actuated to cause the respective associated sticker support bracket to contact and lift a predetermined sticker from a sticker in-feed conveyor. Selective actuation of a given vertical actuating mechanism in conjunction with the selective actuation of the horizontal actuating mechanism can cause the associated sticker support bracket to contact a predetermined sticker and to move the sticker from the sticker in-feed conveyor to a respective sticker tray.

In accordance with an additional embodiment of the present invention, a sticker placing apparatus for use with a lumber stacking apparatus includes a base and an actuating assembly supported by the base, and a sticker support bracket supported by the actuating assembly, wherein the actuating assembly is configured to move the sticker support bracket upwardly in a substantially vertical direction from a first position to a second position, whereby during movement of the sticker support bracket from the first position to the second position, a sticker is lifted by the sticker support bracket from a sticker in-feed conveyor.

Turning now to FIG. 1, a schematic side elevation view is shown which depicts a lumber stacking apparatus 100 in accordance with one embodiment of the present invention. It is understood that the general operation and configuration of prior art lumber stacking apparatus are well known and have been explained hereinabove in conjunction with the discussion of several prior art patents. Further, it is understood that the present invention pertains only to several of the many aspects and features of a functional lumber stacking apparatus.

Thus, in the interest of clearly presenting the relevant aspects and features of the present invention, those aspects, features, functions, operations, and the like, of a lumber stacking apparatus which are not the subject of the present invention and which are known and understood, will not be discussed or shown in detail. Further, some aspects and features, and the like, of a typical functioning lumber stacking apparatus are not shown or discussed herein with the understanding that the inclusion of such aspects and features would have been redundant and would have detracted from the presentation and explanation of the various aspects, features, and elements of the present invention.

Still referring to FIG. 1, the lumber stacking apparatus 100 generally includes a lumber in-feed conveyor 22 on which a course, or layer, 25 of lumber pieces, or boards, 24 is accumulated in preparation for the formation of a stack of lumber (not shown). The lumber pieces 24 are accumulated and formed into a lumber course 25 at a pick-up station 15. The lumber in-feed conveyor 22 can be configured in the manner of a typical prior art lumber in-feed conveyor, and can include several lumber in-feed conveyor elements 23 on which the lumber pieces 24 are supported.

The lumber stacking apparatus 100 also generally includes a fork assembly 50 that, in turn, includes a plurality of substantially parallel fork arms 51 which are depicted in end view. Each of the fork arms 51 has an associated sticker tray 27 connected thereto, as is shown. Each fork arm 51 has a substantially flat upper surface 52 defined thereon. The fork assembly 50 is configured to move in an upwardly direction, wherein the upper surface 52 of each fork arm 51 contacts the lumber course 25 to lift the lumber course from the lumber in-feed conveyor 22. The fork assembly 50 is configured to lift the lumber course 25 from the lumber in-feed conveyor 22 at the pick-up station 15 in the manner discussed above with respect to the prior art, wherein successive lumber courses are moved from the pick-up station to a stacking station (not shown) where a lumber stack is formed.

As is further depicted by FIG. 1, the lumber stacking apparatus includes a sticker infeed conveyor 16. The sticker in-feed conveyor 16 can be configured in the manner of a typical prior art sticker in-feed conveyance means such as that which is discussed above with respect to the prior art. The sticker in-feed conveyor 16 can comprise, for example, a pair of sprockets 17, or the like, on which a conveyor chain 18, or the like, is operatively supported. A sticker distribution device 19, such as a sticker feeder or the like, is preferably included in the apparatus 100, and is configured to selectively distribute stickers 14 on the sticker in-feed conveyor 16 at predetermined intervals.

The lumber stacking apparatus 100 can include a rake-off device 500 in accordance with one embodiment of the present invention. The rake-off device is briefly described here and will be described in greater detail in later discussion. The rake-off device 500 is employed to remove the stickers 14 from the respective sticker trays 27 at the stacking station (not shown). The rake-off device 500 preferably includes a rake-off bar 511 and operatively supported thereon at least one roller 514 that is configured to contact and roll upon the upper surface 52 of an associated fork arm 51 as will be described in greater detail below.

The apparatus 100 also preferably comprises a sticker placing apparatus 200. The sticker placing apparatus 200 is configured to be employed to lift at least one sticker 14 from the sticker in-feed conveyor 16, and to place the sticker in the respective sticker tray 27. In its basic configuration, the sticker placing apparatus 200 comprises a sticker support bracket 210, and an actuating assembly 290 to which the sticker support bracket is operatively connected. The actuating assembly 290 is configured to move the sticker support bracket 210 in a manner which results in the sticker 14 being picked up from the sticker in-feed conveyor and moved to the sticker tray 27 by the sticker support bracket. The sticker support bracket 210 is configured to cradle at least a portion of the sticker 14 while the sticker is moved from the sticker in-feed conveyor 16 to the respective sticker tray 27.

The actuating assembly 290 preferably includes a horizontal actuating mechanism 220 operatively connected to the sticker support bracket 210, and a vertical actuating mechanism 230 also operatively connected to the sticker support bracket. The term "actuating mechanism," as used herein, means any mechanism that is configured to be employed to selectively move a first object relative to a second object in a substantially linear direction. It is understood that, although specific numbers of actuating mechanisms are depicted in the accompanying figures, such depiction is not intended to specify or limit the number of actuating mechanisms which can be effectively employed in conjunction with the present invention.

Actuating mechanisms are well known and a nearly limitless number of variations thereof can be assembled from different components including, motors, hydraulic and pneumatic cylinders, drive linkages, guides, and the like. Thus, the graphical symbols shown in the accompanying figures are employed to generally represent respective actuating mechanisms and are not intended represent specific forms thereof. It is therefore understood that the various embodiments of the present invention are not limited to any particular configuration or form of actuating mechanisms.

Furthermore, the term "operatively connected" means that a first object is connected to a second object by way of any known means which can be employed to allow the intended operation to be performed. Accordingly, the horizontal actuating mechanism 220 is operatively connected to the sticker support bracket 210 by way of any known force-transmitting means, such as linkages and the like, which will allow the horizontal actuating mechanism to move the horizontal support bracket in a substantially horizontal direction.

Likewise, the vertical actuating mechanism 230 is operatively connected to the sticker support bracket 210 by way of any known force-transmitting means, such as linkages and the like, which will allow the vertical actuating mechanism to move the horizontal support bracket in a substantially horizontal direction. Preferably, the horizontal actuating mechanism 220 and the vertical actuating mechanism 230 are each operatively connected to the sticker support bracket 210 in a series configuration.

That is, preferably, the sticker support bracket 210 is operatively connected to the horizontal actuating mechanism 220, which in turn, is operatively connected to the vertical tactuating mechanism 230 as shown in FIG. 1. In this manner, the horizontal actuating mechanism 220 is operatively connected to the sticker support bracket 210 to selectively cause the sticker support bracket to move in a substantially horizontal direction, while at the same time, the vertical actuating mechanism 230 is operatively connected to the sticker support bracket by way of the horizontal actuating mechanism to selectively cause both the horizontal actuating mechanism and the sticker support bracket to move in a substantially vertical direction. Alternatively, the relative positions of the horizontal actuating mechanism 220 and the vertical actuating mechanism 230 can be reversed as will be discussed in greater detail below with respect to an alternative embodiment.

It is understood that selective actuation and/or control of the horizontal actuating mechanism 220, and the vertical actuating mechanism 230, as well as any other mechanism or device shown or described herein, can be achieved by means which are well known and understood in the art. That is, various prior art controllers (not shown) such as Programmable Logic Computers ("PLC's") and the like, which incorporate various data processing components such as digital processors, data storage memories, and the like, can be employed in conjunction with various other control devices such as proximity sensors, limit switches, and the like, to selectively control and modulate the performance, including the actuation, of the horizontal and vertical actuating mechanisms 220 and 230, respectively. Therefore, because such aspects are well known, they are not described or shown herein.

As further examination of FIG. 1 reveals, a base 80 is preferably provided on which the sticker placing apparatus 200 can be supported. Specifically, the vertical actuating mechanism 230 is preferably supported by the base 80. The base 80 can be any known object on which the sticker placing apparatus 200 can be supported. For example, the base 80 can be a floor. Alternatively, the base 80 can be a frame or structural member that is common to another portion of the lumber stacking apparatus 100. Further forms of the base 80 are possible in accordance with the present invention.

The sticker placing apparatus 200 can further comprise a support member 250 that is operatively connected to the vertical actuating mechanism 230, whereby the vertical actuating mechanism is configured to move the support member in a substantially vertical direction. The support member 250 is preferably a structural element that comprises a substantially rigid beam or the like. The sticker placing apparatus 200 also preferably includes a carriage member 260 that is movably supported by the support member 250, whereby the carriage member is configured to move relative to the support member.

The carriage member 260 is preferably supported by the support member 250 by way of a slider mechanism 270, or the like, that allows the carriage member to slide relative to the support member. The slider mechanism 270 can have the form of any such known devices that are configured to support a first object on a second object while allowing the first object to move linearly relative to the second object. For example, the slider mechanism 270 can comprise a series of rollers (not shown) and a track (not shown) in which such rollers can operatively travel. Alternatively, any of a number of types of slide devices can be employed which comprise slide members such as ball-bearing linear slides or self-lubricating slide pads.

The range of movement of the carriage member 260 is preferably constrained, whereby the movement thereof is limited to substantially linear, horizontal movement relative to the support member 250. As is further seen, the horizontal actuating mechanism 220 is preferably operatively connected to the carriage member 260 and is configured to move the carriage member relative to the support member 250. More preferably, the horizontal actuating mechanism 220 is operatively connected between the support member 250 and the carriage member 260 so as to be configured to selectively cause the carriage to move in a substantially horizontal direction relative to the support member.

A sticker support bracket 210 is preferably supported on the carriage member 260 as shown. Preferably, a plurality of sticker support brackets 210 are supported on the carriage member 260. As is seen from a study of FIG. 1, and as will be explained in greater detail below in conjunction with additional figures, the selective actuation of both the vertical actuating mechanism 230 and the horizontal actuating mechanism 220 causes the sticker support bracket 210 to contact and cradle at least a portion of a respective sticker 14, and to move the sticker from the sticker in-feed conveyor 16 to the respective sticker tray 27.

As is further seen, the sticker placing apparatus 200 can include a vertical guide mechanism 231 which is configured to provide alignment and stabilizing guidance of whatever objects are configured to be vertically moved by the vertical actuating mechanism 230. In the specific configuration depicted in FIG. 1, the vertical guide mechanism 231 is configured to provide alignment and stabilizing guidance to the support member 250, the carriage member 260, and the sticker support brackets 210.

It is understood that the vertical actuating mechanism 230 and the vertical guide mechanism 231 can be integral with one another. That is, it is understood that the vertical actuating mechanism 230 can be alternatively configured to have a vertical guide mechanism incorporated therein so as to be integral therewith. Furthermore, it is understood that the support member 250 and the carriage member 260, as well as the slider mechanism 270 can be integral with the horizontal actuating mechanism 220. It is understood that guide mechanisms, as well as slider mechanisms, are well known and that many variations thereof can be alternatively utilized in accordance with the present invention.

The horizontal actuating mechanism 220, along with the vertical actuating mechanism 230, as well as any intermediate components such as the support member 250 and the carriage member 260 can be referred to as the actuating assembly 290. That is, the actuating assembly 290 comprises at least the horizontal actuating mechanism 220 and the vertical actuating mechanism 230, but can also comprise the support member 250 and/or the carriage member 260, as well as any other component that facilitates the performance of the intended function of the actuating assembly which is to selectively move the sticker support bracket 210 in a manner that causes the transfer thereby of the sticker 14 from the sticker in-feed conveyor 16 to the respective sticker tray 27.

It is understood that the actuating assembly 290 need only comprise a single motive power source (not shown), such as a motor or actuator or the like, that can be selectively employed to apply motive power individually to the horizontal actuating mechanism 220 and/or to the vertical actuating mechanism 230. In other words, each of the horizontal actuating mechanism 220 and the vertical actuating mechanism 230 need not include a respective, associated motive power source dedicated each respective mechanism.

As an alternative configuration, a single motive power source can be employed to selectively provide motive power to both the horizontal actuating mechanism 220 and the vertical actuating mechanism 230. However, more preferably, both the horizontal actuating mechanism 220 and the vertical actuating mechanism each comprise an associated motive power source that is dedicated to supplying motive power thereto. Further, in view of the well know nature of motive power sources, such need not be discussed or shown herein.

The following description, in conjunction with additional figures as noted, of a typical sequential operation of the sticker placing apparatus 200 will more clearly illustrate the functional aspects thereof. Still referring to FIG. 1, each of the sticker support brackets 210 is initially located at a respective first position 201. The respective first position 201 of each sticker support bracket 210 is substantially directly below the associated sticker 14 which is supported on the sticker in-feed conveyor 16. While each sticker support bracket 210 is located at its respective first position 201, the actuating assembly 290 can be selectively actuated to cause the sticker support bracket to move upwardly in a substantially vertical direction.

Moving now to FIG. 2, another schematic side elevation view is shown which depicts the lumber stacking apparatus 100 which is shown in FIG. 1 and described above with respect thereto, except that, in FIG. 2, the actuating assembly 290 of the sticker placing apparatus 200 is depicted as having been selectively actuated so as to raise the sticker support brackets 210 from the first position 201 thereof to a second position 202 which is located substantially directly there above as shown.

That is, the sticker support bracket 210 is connected to the actuating assembly 290, wherein the actuating assembly is configured to be selectively actuated so as to move the sticker support bracket upwardly in a substantially vertical direction from a first position 201 to a second position 202, wherein during such movement from the first position to the second position, the sticker support bracket contacts the sticker 14, whereby the sticker is lifted from the sticker in-feed conveyor 16.

That is, as shown, the vertical actuating mechanism 230 can be actuated to move the sticker support bracket 210 from the first position 201 to the second position 202, wherein the sticker support bracket contacts and lifts the sticker from the sticker in-feed conveyor 16. The sticker placing apparatus 200 can be configured in the manner specifically shown, wherein the support member 250 and the carriage member 260 are raised along with the sticker support bracket 210 when the sticker support bracket is moved from the first position 201 to the second position 202.

Figure 2:
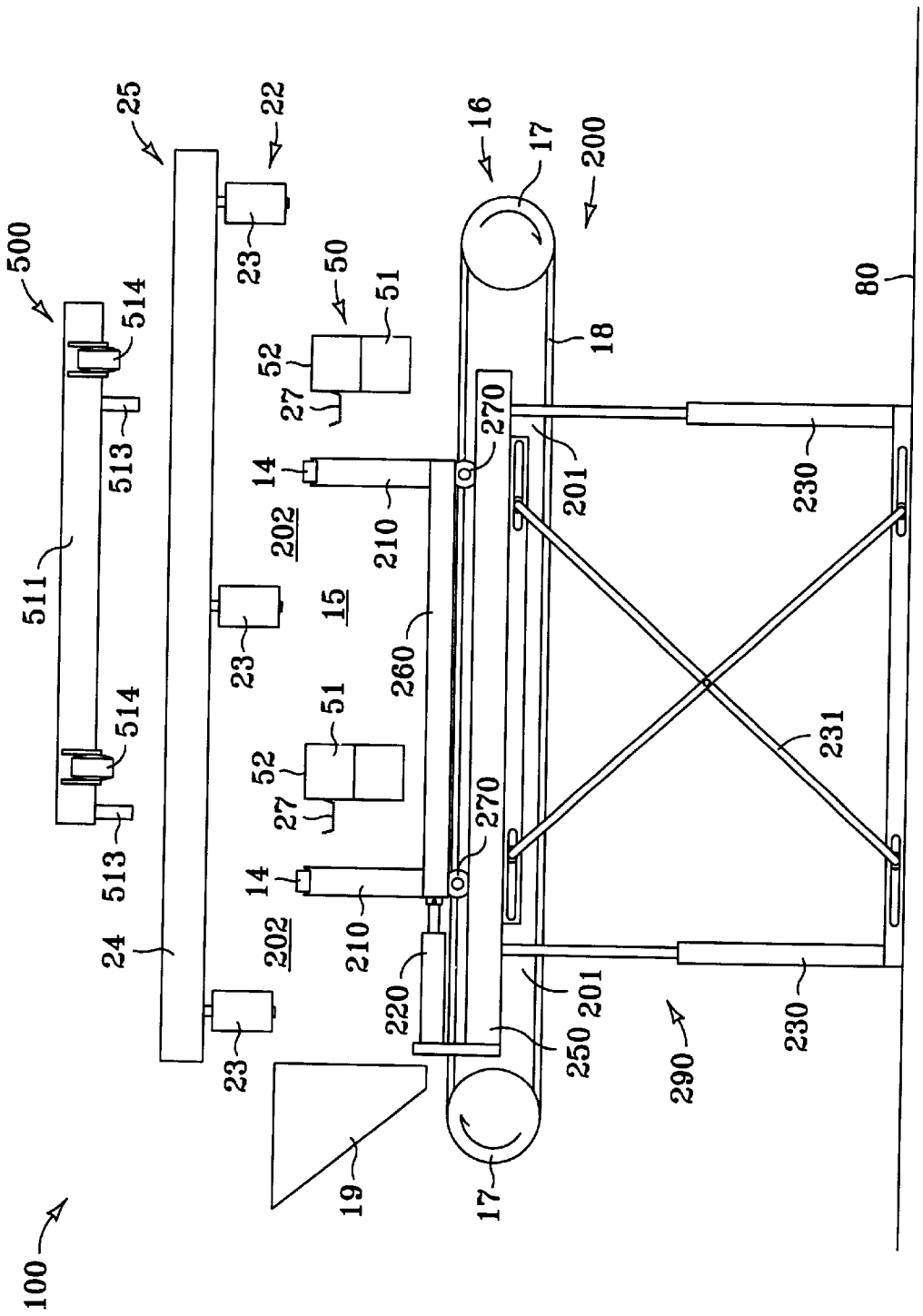
FIG. 2 is a schematic side elevation view in which the lumber stacking apparatus of FIG. 1 is depicted, wherein the sticker support bracket is shown in a second position.

Moving now to FIG. 3, still another schematic side elevation view is shown which depicts the lumber stacking apparatus 100 which is shown in FIGS. 1 and 2, and which is described above with respect thereto, except that, in FIG. 3, the actuating assembly 290 of the sticker placing apparatus 200 is shown to have been actuated so as to move the sticker support bracket 210, and thus, the sticker 14, from the second position 202 to a third position 203 which is substantially over the sticker tray 27, and which is at substantially the same elevation as the second position.

Figure 3:
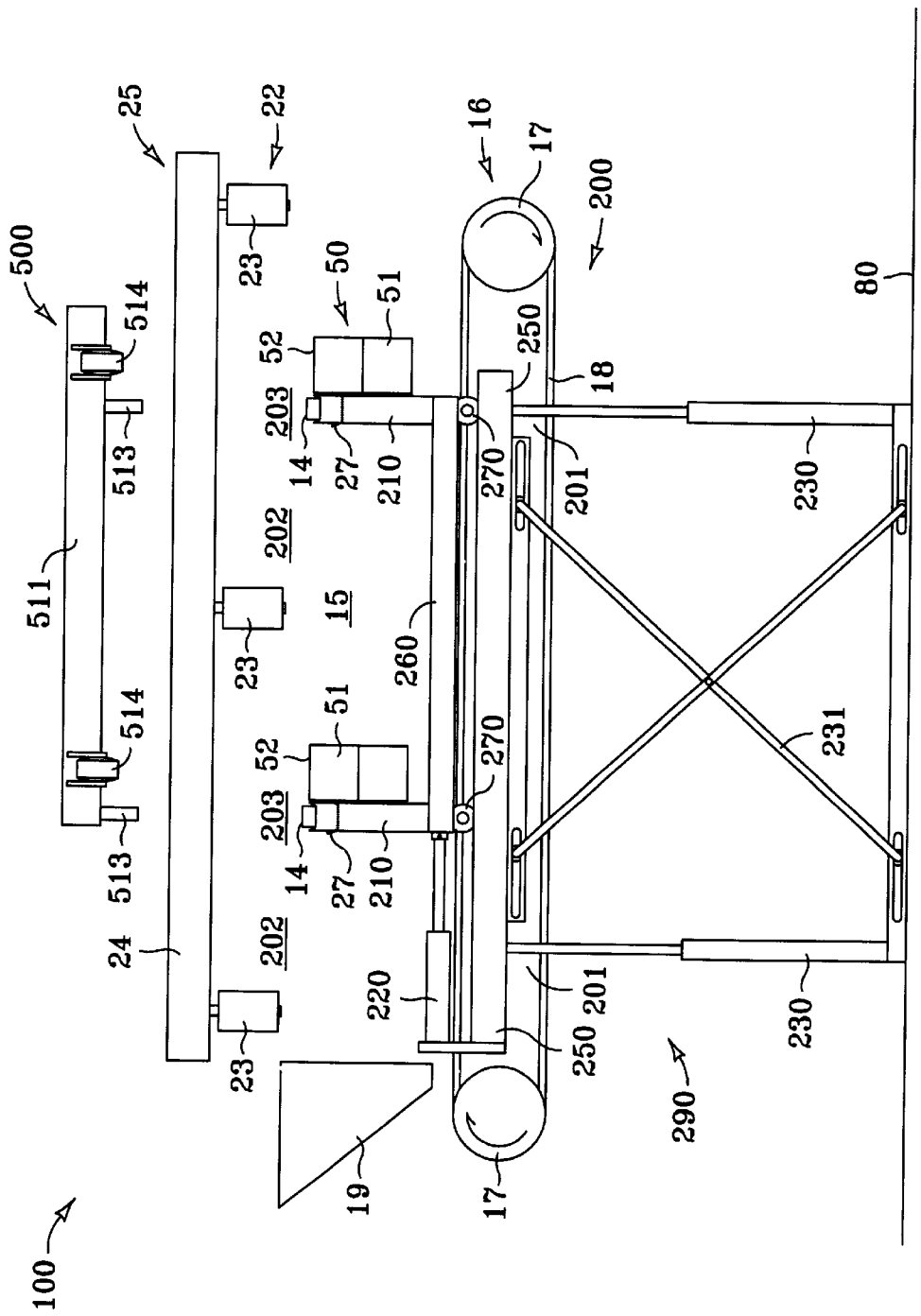
FIG. 3 is a schematic side elevation view in which the lumber stacking apparatus of FIG. 1 is depicted, wherein the sticker support bracket is shown in a third position.

Specifically, as is shown in FIG. 3, the actuating assembly 290 is preferably further configured to move the sticker support bracket 210 substantially horizontally from the second position 202 to a third position 203, wherein the sticker 14 is held by the sticker support bracket 210 substantially directly above the sticker tray 27. That is, when the sticker support bracket 210 is located in the second position 202, the horizontal actuating mechanism 220 can be selectively actuated to move the sticker support bracket 210 in a substantially horizontal direction to the third position 203. The configuration of the sticker placing apparatus 200, as depicted, provides for the carriage member 260 to move in a substantially horizontal direction relative to the support member 250 when the sticker support bracket 210 is moved from the second position 202 to the third position 203.

Turning to FIG. 4, yet another schematic side elevation view is shown which depicts the lumber stacking apparatus 100 which is shown in FIGS. 1, 2, and 3, and which is described above with respect thereto, except that, in FIG. 4, the actuating assembly 290 of the sticker placing apparatus 200 is shown to have been actuated so as to move the sticker support bracket 210 from the third position 203 to a fourth position which is substantially directly below the third position.

In other words, the actuating assembly 290 is preferably further configured to move the sticker support bracket 210 in a substantially vertical direction and downwardly from the third position 203 to the fourth position 204, wherein during such movement of the sticker support bracket from the third position to the fourth position, the sticker 14 is deposited on the sticker tray 27 and is released from the sticker support bracket. Specifically, when the sticker support bracket 210 is located in the third position 203, the vertical actuating mechanism 230 can be actuated so as to cause the sticker support bracket to move downwardly in a substantially vertical direction from the third position to the fourth position 204. During such movement, the sticker 14 is transferred from the sticker support bracket 210 to the associated sticker tray 27.

Figure 4:
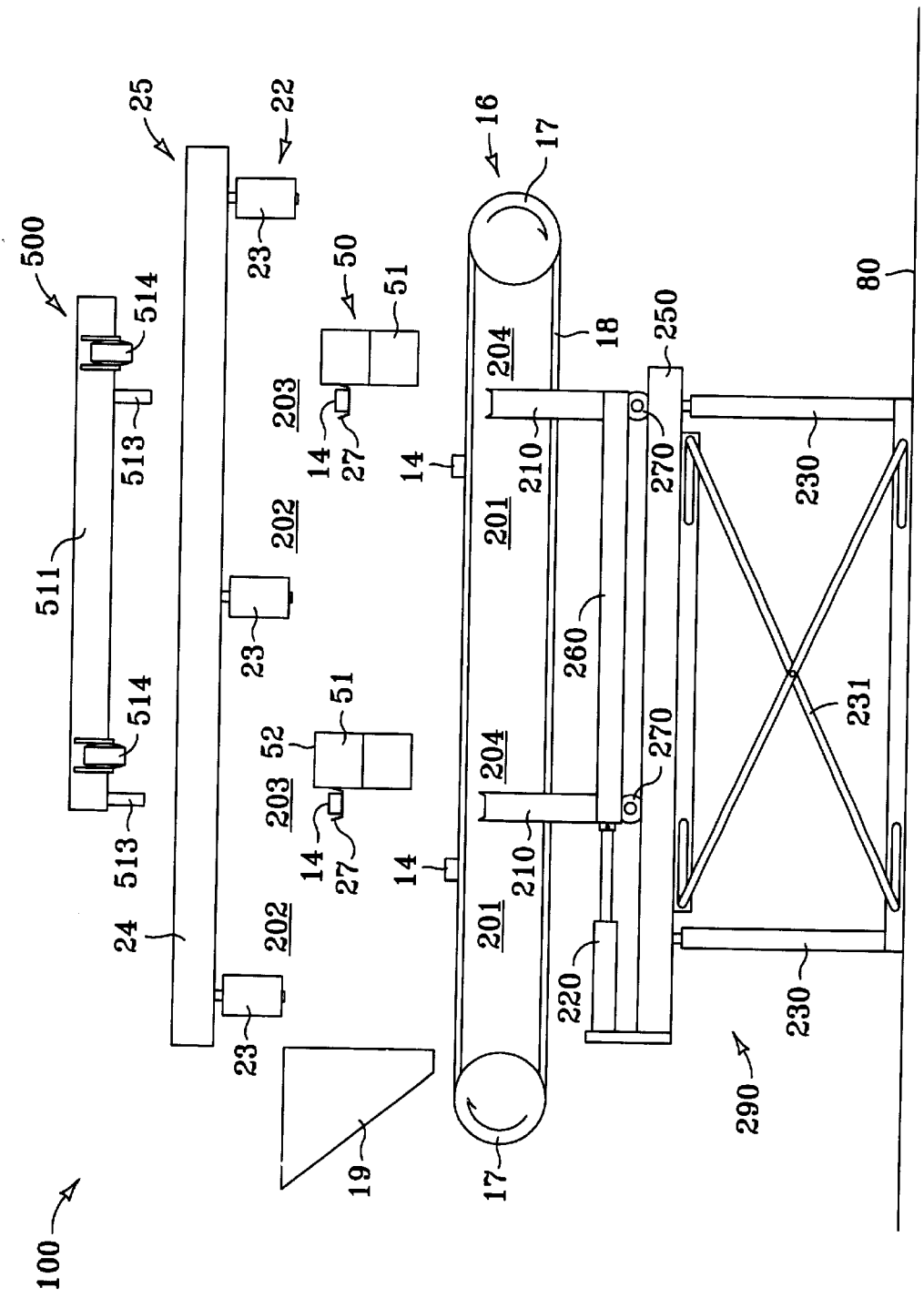
FIG. 4 is a schematic side elevation view in which the lumber stacking apparatus of FIG. 1 is depicted, wherein the sticker support bracket is shown in a fourth position.

As is seen with reference to both FIGS. 1 and 4, the actuating assembly 290 of the sticker placing apparatus 200 can be further configured to cause the sticker support bracket 210 to move in a substantially horizontal direction from the fourth position 204 to the first position 201, from whence the above-described operational sequence of the sticker placing apparatus 200 can be repeated to place a successive sticker 14 in the respective sticker tray 27. That is, during at least a portion of the movement of the sticker support bracket 210 as described above, successive stickers 14 can be deposited onto the sticker in-feed conveyor 16 from the sticker distribution device 19, and moved into position as shown in FIG. 4.

Referring now to FIGS. 1, 2, 3, and 4, the sticker placing apparatus 200 can be employed to selectively remove stickers 14 from the respective sticker trays 27. Furthermore, the sticker placing apparatus 200 can be employed to not only remove the stickers from the respective sticker trays 27, but also to redeposit the stickers upon the sticker in-feed conveyor 16 which, in turn, can allow the stickers to be completely removed from the lumber stacking apparatus 100 after being placed on the respective sticker trays 27. Such removal of the stickers from the sticker trays by the sticker placing apparatus can prove to be advantageous from several standpoints, including the avoidance of requiring manual removal of the stickers from the sticker trays.

Specifically, the actuating assembly 290 of the sticker placing apparatus 200 is preferably further configured to move the sticker support bracket upwardly in a substantially vertical direction from the fourth position 204 to the third position 203, wherein during such movement from the fourth position to the third position the sticker support bracket contacts the sticker, whereby the sticker is lifted from the sticker tray 27 by the sticker support bracket. The actuating assembly 290 is preferably further configured to move the sticker support bracket 210 in a substantially horizontal direction from the third position 203 to the second position 202, whereby the sticker 14 is supported on the sticker support bracket in the second position.

In order to provide for redeposit of the sticker 14 upon the sticker in-feed conveyor 16, the actuating assembly 290 of the sticker placing apparatus 200 is preferably configured to move the sticker support bracket 210 in a substantially vertical direction and downwardly from the second position 202 to the first position 201, wherein during such movement of the sticker support bracket from the second position to the first position, the sticker 14 is deposited on the sticker in-feed conveyor 16 and is released from the sticker support bracket. Thus, the actuating assembly 290 is preferably configured to be selectively actuated in a manner wherein each movement of the sticker support bracket 210 can be selectively reversed.

In this manner, the actuating assembly 290 can be actuated to cause the sticker support bracket 210 to lift the sticker 14 from the sticker in-feed conveyor 16 and to either hold the sticker in the second position indefinitely, or place the sticker in the sticker tray 27, or replace the sticker on the sticker in-feed conveyor. Such movements, and/or portions of such movements, of the sticker support bracket 210 as the result of selective actuation of the actuating assembly 290 can be reversed, wherein the sticker support bracket is caused to lift the sticker 14 from the sticker tray 27, and move to the second position 202. Once at the second position 202, the sticker support bracket 210 can either hold the sticker 14 in the second position, replace the sticker in the sticker tray 27, or deposit the sticker on the sticker in-feed conveyor 16.

It is understood that the movements, and/or portions thereof, of the sticker support bracket 210 as the result of selective actuation of the actuating assembly 290 can be combined so as to be performed simultaneously in the pursuit of efficiency of movement. That is, for example, once the sticker 14 is deposited in the sticker tray 27 during movement of the sticker support bracket 210 from the third position 203 to the fourth position 204, the movement of the sticker support bracket from the fourth position to the first position 201 can be commenced so as to substantially coincide with the remainder of the movement of the sticker support bracket from the third position to the fourth position.

More specifically, during movement of the sticker support bracket 210 from the third position 203 to the fourth position 204, preferably only the vertical actuating mechanism 230 is initially actuated to provide a substantially vertical and downward movement of the sticker support bracket from the third position to a point at which the sticker 14 is deposited on the sticker tray 27 and is released from the sticker support bracket.

However, after the point is reached at which the sticker 14 is transferred from the sticker support bracket 210 to the sticker tray 27 during substantially vertical downward movement of the sticker support bracket as the result of actuation of the vertical actuating mechanism 230, the horizontal actuating mechanism 220 can be selectively actuated simultaneously with the actuation of the vertical actuating mechanism to result in a substantial by-pass of the fourth position.

That is, after the sticker 14 is transferred from the sticker support bracket 210 to the sticker tray 27 during substantially vertical, downward movement of the sticker support bracket from the third position toward the fourth position, the horizontal actuating mechanism 220 can be actuated coincidentally with the continued actuation of the vertical actuating mechanism 230, wherein the sticker support bracket is then moved substantially directly to the first position, thereby by-passing the fourth position.

It is noted that, due to the unique configuration of the actuating assembly 290 of the present invention, the orientation of the sticker support bracket 210 with respect to the sticker tray 27 remains substantially constant during movement with respect thereto of the support bracket. In other words, the sticker support bracket 210 remains in a substantially upwardly-pointing orientation regardless of the position, movement, or location of the support bracket. This can be advantageous in facilitating control of the sticker 14 during movement thereof between the sticker in-feed conveyor 16 and the sticker tray 27, and vice versa.

Figure 5:
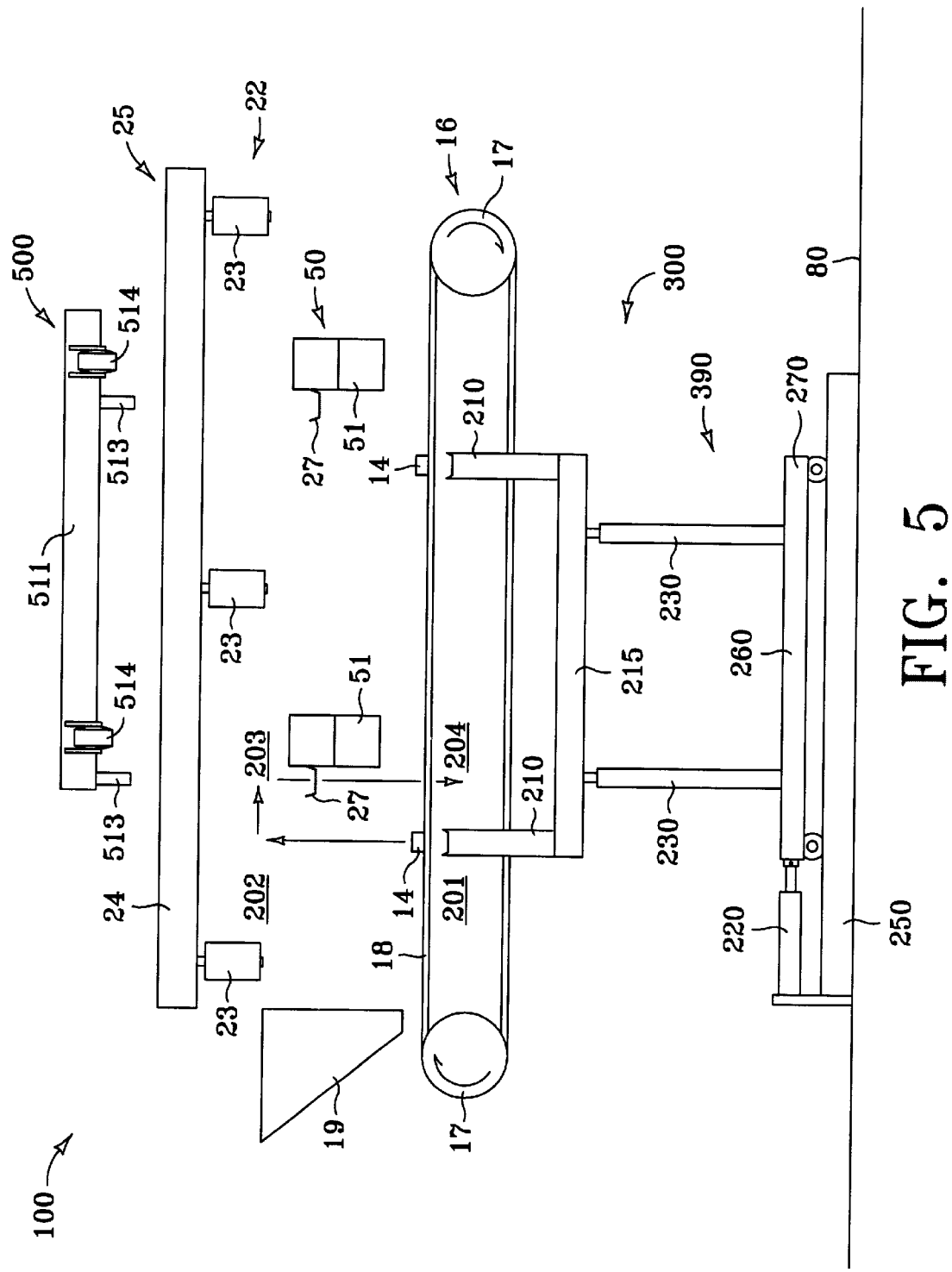
FIG. 5 is a schematic side elevation view in which a lumber stacking apparatus is depicted in accordance with another embodiment of the present invention, wherein a sticker placing apparatus having an alternative configuration is shown.

Turning now to FIG. 5, a schematic side elevation view is shown in which the lumber stacking apparatus 100 is depicted. However, the lumber stacking apparatus 100 as depicted in FIG. 5 includes a sticker placing apparatus 300 having an alternative configuration with respect to the configuration of the sticker placing apparatus 200 described above and shown in FIGS. 1 through 4.

More specifically, with reference now to FIGS. 1 and 5, the positions of the of the horizontal actuating mechanism 220 and the vertical actuating mechanism 230 of the sticker placing apparatus 200 shown in FIG. 1 are substantially reversed relative to the positions of the horizontal actuating mechanism and the vertical actuating mechanism of the sticker placing apparatus 300 shown in FIG. 5. In other words, the only relevant difference in the lumber stacking apparatus 100 as depicted in FIGS. 1 and 5 is that the sticker placing apparatus 200 is shown in FIG. 1, while the sticker placing apparatus 300, having a different configuration, is shown in FIG. 5.

That is, as shown in FIG. 1, the sticker placing apparatus 200 comprises a horizontal actuating mechanism 220 that is operatively connected intermediate the vertical actuating mechanism 230 and the sticker support bracket 210, while, as shown in FIG. 5, the sticker placing apparatus 300 comprises a vertical actuating mechanism 230 that is operatively connected intermediate the horizontal actuating mechanism 220 and the sticker support bracket 210.

As is seen in FIG. 5, the alternatively configured: sticker placing apparatus 300 comprises a base 80 which has been described above. The sticker placing apparatus 300 also comprises a carriage member 260 that is movably supported by the base, whereby the carriage member is configured to move in a substantially horizontal direction relative to the base.

Preferably, the sticker placing apparatus 300 also comprises a support member 250 that is positioned intermediate the carriage member 260 and the base 80, whereby the support member is supported by the base and the carriage member is operatively supported on the support member as described above with respect to the sticker placing apparatus 200. That is the slider mechanism 270 is preferably included in the sticker placing apparatus 300 and is preferably operatively disposed between the support member 250 and the carriage member 260.

The sticker placing apparatus 300 further includes a horizontal actuating mechanism 220 connected to the carriage member 260 and configured to move the carriage member relative to the base 80. The horizontal actuating mechanism 220 can preferably be operatively connected between the base 80 and the carriage member 260 to move the carriage member in a substantially horizontal direction relative to the base 80.

The sticker placing apparatus 300 also comprises a vertical actuating mechanism 230 that is supported by the carriage member 260. The horizontal actuating mechanism 220 along with the vertical actuating mechanism 230 make up the actuating assembly 390. Other components, if so included in the sticker placing apparatus 300 can also make up a portion of the actuating assembly, such as the carriage member 260, the support bracket 250, and the slider mechanism 270.

The sticker support bracket 210 is supported by the vertical actuating mechanism 230, whereby the vertical actuating mechanism can be actuated to cause the sticker support bracket to be moved in a substantially horizontal direction relative to the carriage member 260. As is seen, a plurality of sticker support brackets 210 is preferably included in the sticker placing apparatus 300. In that case, a bracket frame 215 can be employed to support the sticker support brackets 210. That is, the bracket frame 215 can be operatively supported by the vertical actuating mechanism 230, wherein the plurality of sticker support brackets 210 are supported by the bracket frame 215.

Notwithstanding the difference between the respective configurations of the sticker placing apparatus 200 and the sticker placing apparatus 300, it can be appreciated that both of the aforementioned sticker placing apparatus can be made to operate in substantially similar manners with regard to the intended function of moving the sticker 14 from the sticker in-feed conveyor 16 to the respective sticker tray 27.

Specifically, with reference now to FIG. 5, the sticker support bracket 210 of the sticker placing apparatus 300 is initially located in the first position 201, with the respective sticker 14 located substantially directly above the sticker support bracket and upon the sticker in-feed conveyor 16, having been brought into position thereon.

The vertical actuating mechanism 230 can then selectively actuated to cause the sticker support bracket 210 to move upwardly in a substantially vertical direction toward the second position 202, wherein during such upward movement, the sticker support bracket contacts and lifts the respective sticker 14 from the sticker in-feed conveyor 16 in a manner similar to that described above with respect to the sticker placing apparatus 200 shown in FIGS. 1 through 4.

As is seen by further study of FIG. 5, once the sticker support bracket 210 reaches the second position 202 by way of actuation of the vertical actuating mechanism 230, the horizontal actuating mechanism 220 can then be selectively actuated, whereby the carriage member 260 is caused to move in a substantially horizontal direction, which in turn causes the sticker support bracket 210 to be moved from the second position to the third position 203.

That is, upon the positioning of the sticker support bracket 210 at the third position 203 and being moved from the first position 201 and through the second position 202, both the horizontal actuating mechanism 220 and the vertical actuating mechanism 230 will have been selectively and successively actuated. More specifically, during such movement of the sticker support bracket 210 from the first position 201 to the second position 202 and on to the third position 203, the vertical actuating mechanism 230 is actuated before actuation of the horizontal actuating mechanism 220.

When the sticker support bracket 210 is held at the third position 203, the sticker 14 is located substantially directly above the sticker tray 27. Thus, in placing the sticker 14 into the sticker tray 27, the vertical actuating mechanism 230 is selectively actuated so as to cause the sticker support bracket 210, having the sticker supported thereon, to move downwardly in a substantially vertical direction from the third position 203 and toward the fourth position 204. Upon the transfer of the sticker 14 from the sticker support bracket 210 to the sticker tray 27, the vertical actuating mechanism 230 and the horizontal actuating mechanism can be individually selectively actuated so as to cause the sticker support bracket to move to the fourth position 204 and then back to the first position 201.

Alternatively, as described above with respect to the sticker placing apparatus 200 which is shown in FIGS. 1 through 4, the vertical actuating mechanism 230 and the horizontal actuating mechanism 220 can be individually selectively actuated so as to cause the sticker support bracket 210 to move directly to the first position 201, while by-passing the fourth position 204, after the transfer of the sticker 14 from the sticker support bracket to the sticker tray 27 has occurred.

That is, after the transfer of the sticker 14 to the sticker tray 27 has taken place, the actuating assembly 290 can be selectively actuated in respective manners which will result in the sticker support bracket 210 either proceeding to the fourth position 204 and then back to the first position 210, or directly to back to the first position, thus by-passing the fourth position 204.

Figure 6:
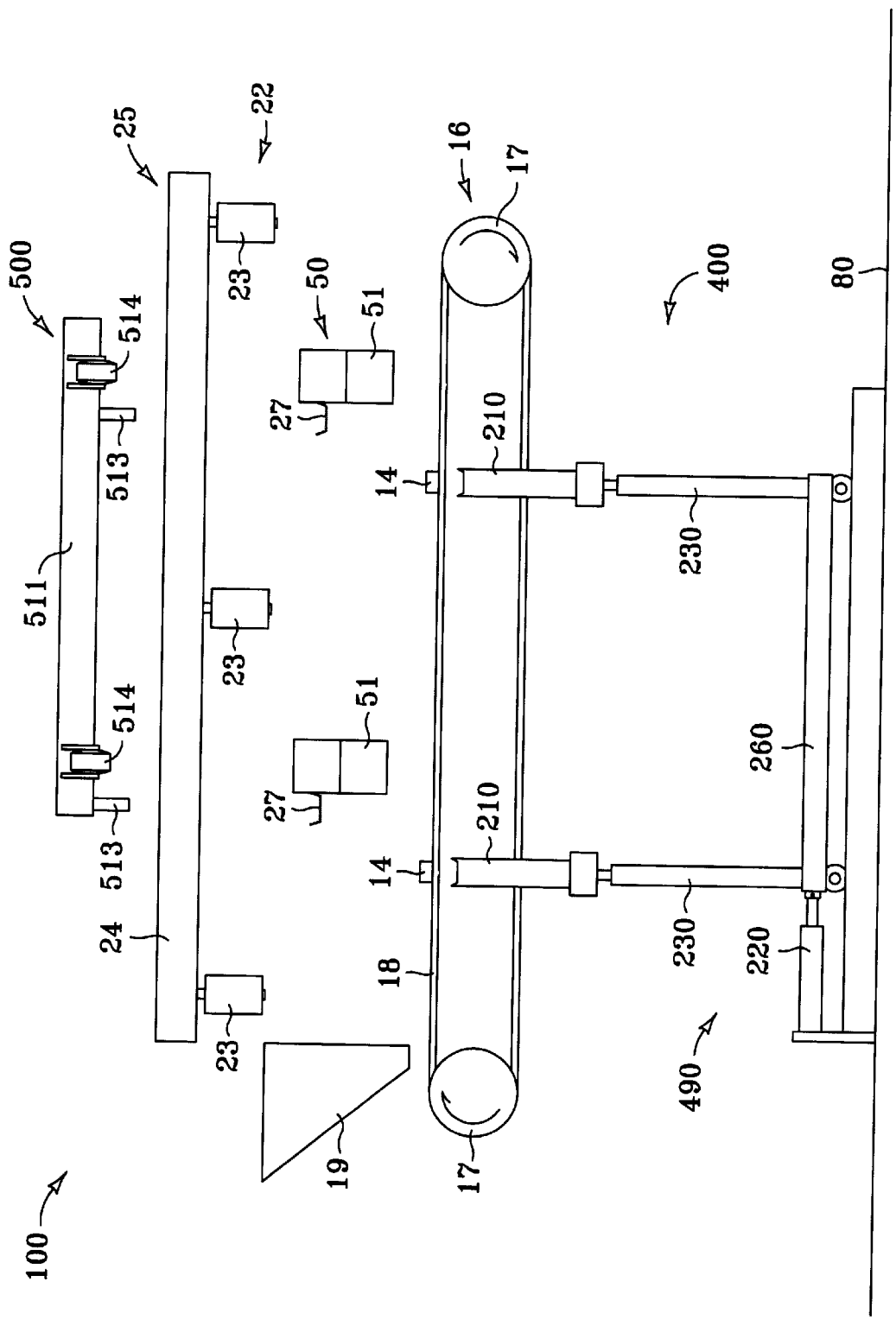
FIG. 6 is a schematic side elevation view in which a lumber stacking apparatus is depicted in accordance with yet another embodiment of the present invention, wherein a sticker placing apparatus having a further alternative configuration is shown.

Turning now to FIG. 6, an additional schematic side elevation view is shown of the lumber stacking apparatus 100. As shown in FIG. 6, still another alternative configuration of the sticker placing apparatus depicted. That is, in FIG. 6, the lumber stacking apparatus 100 is shown to include the sticker placing apparatus 400, having an alternative configuration relative to the sticker placing apparatus 200 and 300 described above.

As an examination of FIG. 6 reveals, the sticker placing apparatus 400 differs from the previously discussed sticker placing apparatus 200 and 300 which are shown in FIGS. 1 through 4, and FIG. 5, respectively, in that a plurality of sticker support brackets 210 are included, wherein each of the sticker support brackets can be selectively and individually moved in the vertical direction. irrespective of the vertical movement of any other sticker support bracket.

That is, each of the sticker support brackets 210 of the sticker placing apparatus 400, which is shown in FIG. 6, can be selectively and individually raised and lowered without necessarily affecting the vertical positioning of any other sticker support bracket. The sticker placing apparatus 400 preferably comprises an actuating assembly 490 that is configured to move the sticker support bracket 210 so as to cause the transfer thereby of the sticker 14 from the sticker in-feed conveyor 16 to the sticker tray 27. The sticker placing apparatus 400 preferably comprises a base 80 which has been described above with respect to the previously discussed sticker placing apparatus 200 and 300, and on which the actuating assembly 490 is preferably supported.

The actuating assembly preferably includes a carriage member 260 that is movably supported on the base 80, whereby the carriage member can be moved in a substantially horizontal direction relative to the base. More preferably, the carriage member 260 is constrained to allow only substantially horizontal movement thereof relative to the base 80. The actuating assembly 490 also preferably comprises a horizontal actuating mechanism 220 that is connected to the carriage member 260 and configured to cause the carriage member to move relative to the base.

More preferably, the actuating assembly 490 includes a support member 250 that is supported on the base 80, wherein the carriage member 260 is operatively supported on the support member and constrained to move only horizontally relative thereto, and wherein the horizontal actuating mechanism 220 is operatively disposed between the support member 250 and the carriage member 260, whereby selective actuation of the horizontal actuating mechanism causes the carriage to move in a substantially horizontal direction relative to the base and to the support member. Further, the slider mechanism 270 is preferably included in the actuating assembly 490 and operatively disposed between the support member 250 and the carriage member 260 as described above.

The actuating assembly 490 of the sticker placing apparatus 400 also preferably includes a plurality of actuating mechanisms 230 that are supported by the carriage member 260. The sticker placing apparatus 400 also comprises a plurality of sticker support brackets 210 that are supported by the vertical actuating mechanisms 230, wherein one sticker support bracket is supported by one associated vertical actuating mechanism, whereby each vertical actuating mechanism is configured to selectively move the associated sticker support bracket in a substantially vertical direction. That is, one sticker support bracket 210 is supported by one exclusively associated vertical actuating mechanism 230 in one-to-one correspondence.

That is, selective actuation of a given individual vertical actuating mechanism 230 can cause only the associated sticker support bracket 210 to be moved in a substantially vertical direction without effecting, or being effected by, the vertical movement of any other sticker support bracket. Further, as is seen from an examination of FIG. 6, selective actuation of both the vertical actuating mechanisms 230 and the horizontal actuating mechanism 220 can cause a given predetermined sticker support bracket to contact the associated sticker 14 and cradle at least a portion of the respective sticker so as to move the sticker from the sticker in-feed conveyor 16 to the respective sticker tray 27.

In this manner, the sticker placing apparatus 400 can be operated to selectively transfer predetermined stickers 14 from the sticker in-feed conveyor 16 to the respective sticker tray 27, while not transferring other stickers from the sticker in-feed conveyor to the respective sticker trays. Conversely stated, the sticker placing apparatus 400 can be operated to selectively allow predetermined stickers 14 to remain on the sticker in-feed conveyor 16, while transferring other stickers from the sticker in-feed conveyor to the respective sticker trays 27. Additionally, the sticker placing apparatus 400 can be advantageously employed to reposition stickers 14 on the sticker in-feed conveyor 16.

Figure 7:
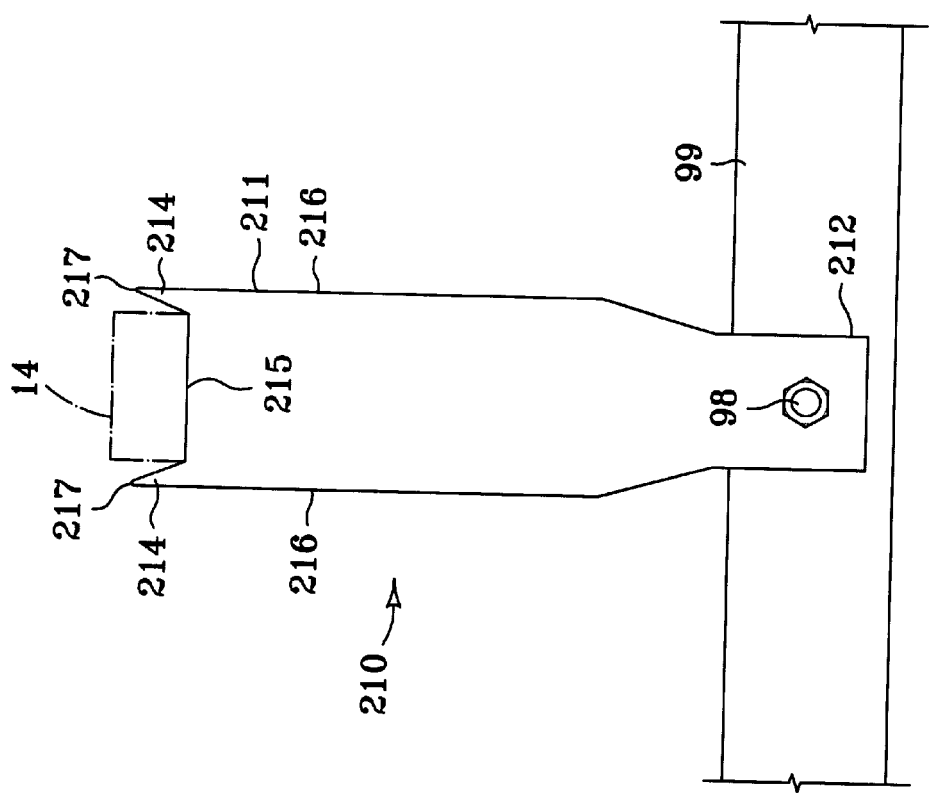
FIG. 7 is a front view of a sticker support bracket in accordance with one embodiment of the present invention.

Turning now to FIG. 7, a front detail view is shown in which the sticker support bracket 210 is depicted in accordance with one embodiment of the present invention. The sticker support bracket 210 is preferably substantially elongated, having a first end 211 and an opposite and distal second end 212. Mounting provisions are preferably provided on the second end 212 for mounting of the sticker support bracket 210 to a frame 99 or the like. For example, a hole (not shown) can be defined in the sticker support bracket 210 proximate the second end 212 for mounting by way of a threaded fastener 98 or the like.

On the first end 211 of the sticker support bracket 210, a cradle area 213 is preferably defined between two substantially parallel, spaced horns 214. The cradle area 213 is configured to cradle and support therein at least a portion of a sticker 14. Each of the horns 214 preferably extends longitudinally from the first end 211. The horns are configured to prevent the sticker 14 from falling off of the sticker support bracket 210 during movement thereof as described above with respect to the sticker placing apparatus 200, 300, and 400.

Also, still referring to FIG. 7, the horns 214 are separated from one another by a cradle surface 215 that is defined on the first end 211. The cradle surface 215 preferably substantially flat and is configured to remain substantially level throughout the operation of the sticker placing apparatus on which the sticker support bracket is supported. The horns 214 are preferably substantially wedge-shaped, and preferably taper evenly to a respective extreme terminus 217.

The horns 214 are also preferably substantially equal in length. The sticker support bracket 210 also preferably has two substantially parallel, opposite sides 216 defined thereon, wherein the cradle area is located substantially between the sides. Each of the sides 216 is also preferably straight and is preferably substantially collinear with the respective terminus 217. That is, each side 216 preferably extends from a respective terminus 217, wherein as extending therefrom, both sides 216 are substantially straight and parallel relative to one another.

Figure 8:
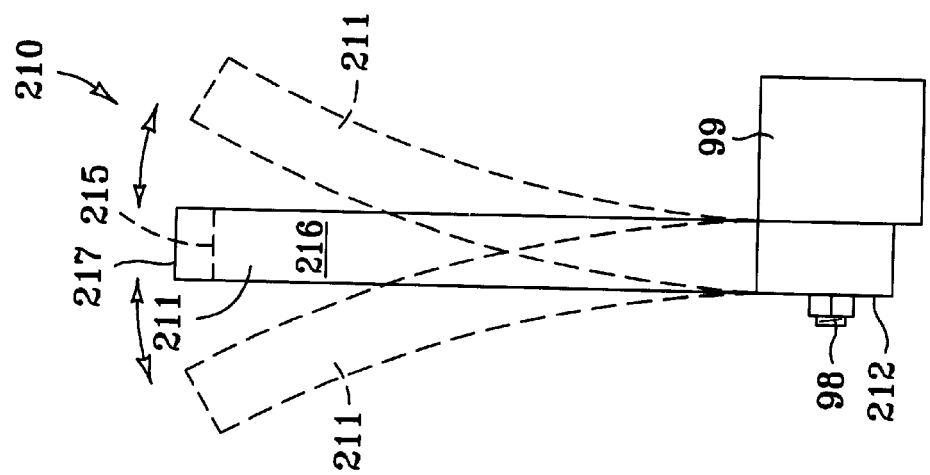
FIG. 8 is a side view of the sticker support bracket that is depicted in FIG. 7.

Turning now to FIG. 8, a side view is shown of the sticker support bracket 210 that is depicted in FIG. 7. As is indicated in FIG. 8, the sticker support bracket 210 is preferably resiliently deflectable. That is, the sticker support bracket 210 is preferably configured to resiliently deflect back and forth, as indicated by the phantom lines, from a normal position in which the sticker support bracket is biased, and which is indicated by the solid lines. In accordance with one alternative configuration of the sticker support bracket 210 which is shown in FIGS. 7 and 8, the sticker support bracket is preferably fabricated from a resiliently flexible material.

For example, the sticker support bracket 210 can be fabricated from a material comprising urethane. Such a resiliently flexible nature of the sticker support bracket 210 can prove advantageous in preventing permanent damage to the sticker support bracket, or other related components, in an event wherein an inadvertent collision occurs between the sticker support bracket and another object such as the sticker tray (not shown), or the like.

Figure 10:
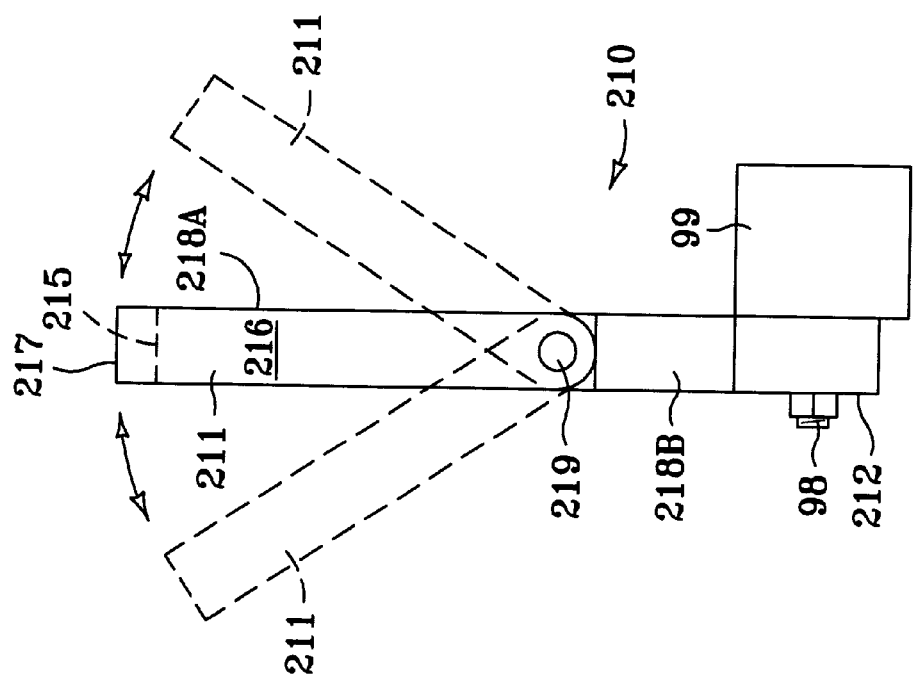
FIG. 10 is a side view of the sticker support bracket that is depicted in FIG. 9.
Figure 9:
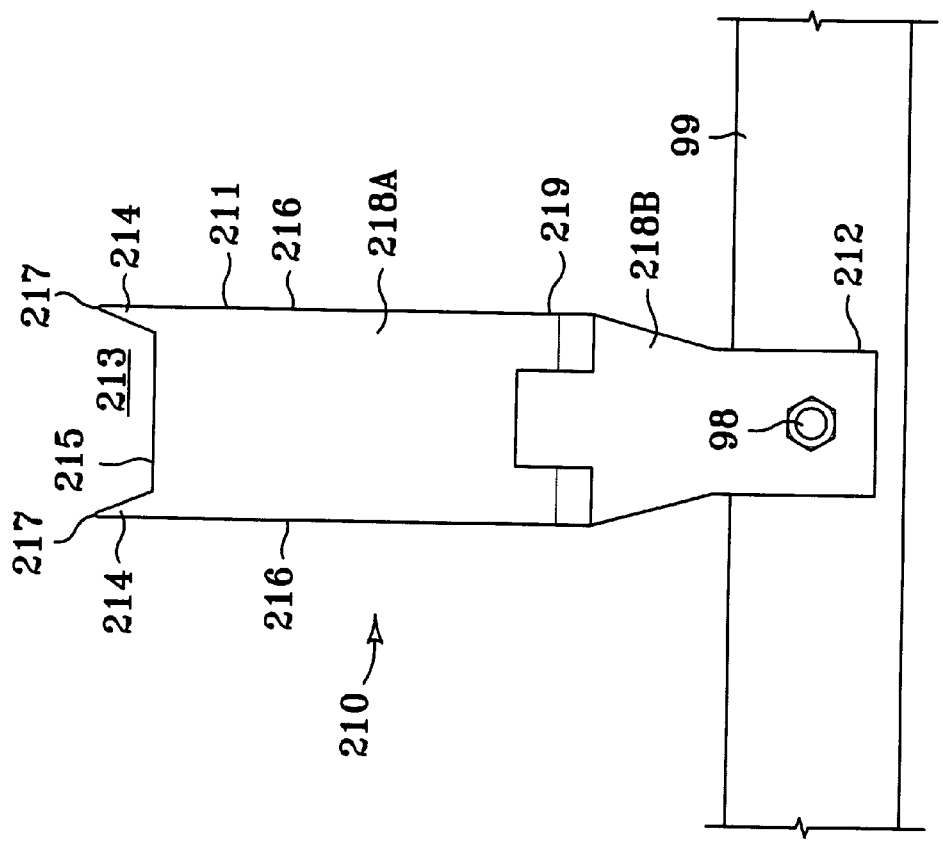
FIG. 9 is a front view of the sticker support bracket having an alternative configuration.

Turning now to FIGS. 9 and 10, a front view and side view, respectively, are shown in which a sticker support bracket 210 having an alternative configuration is depicted. As is seen, the sticker support bracket 210 preferably comprises an upper portion 218A and a lower portion 218B. The first end 211 of the sticker support bracket 210 is defined on the upper portion 218A, while the second end 212 is defined on the lower portion 218B. The upper portion 218A and/or the lower portion 218B can be fabricated from a substantially rigid material. For example, the upper and lower portions 218A and 218B, respectively, can be fabricated from a material comprising metal, such as aluminum or steel.

The sticker support bracket 210 preferably comprises a resiliently flexible joint member 219 that is operatively connected between the upper portion 218A and the lower portion 218B, whereby the first end 211 is resiliently deflectable relative to the second end 212. That is, the joint member 219 is preferably resiliently flexible so as to allow the upper portion 218A to resiliently deflect back and forth, as indicated by the phantom lines, from a normal position in which the upper portion is biased, and which is indicated by the solid lines. The joint member 219 can be made resiliently flexible by the inclusion therein of a resiliently flexible member (not shown), such as a spring or the like. Alternatively, the joint member 219 can be fabricated from a resiliently flexible material, such as urethane or the like.

Figure 11:
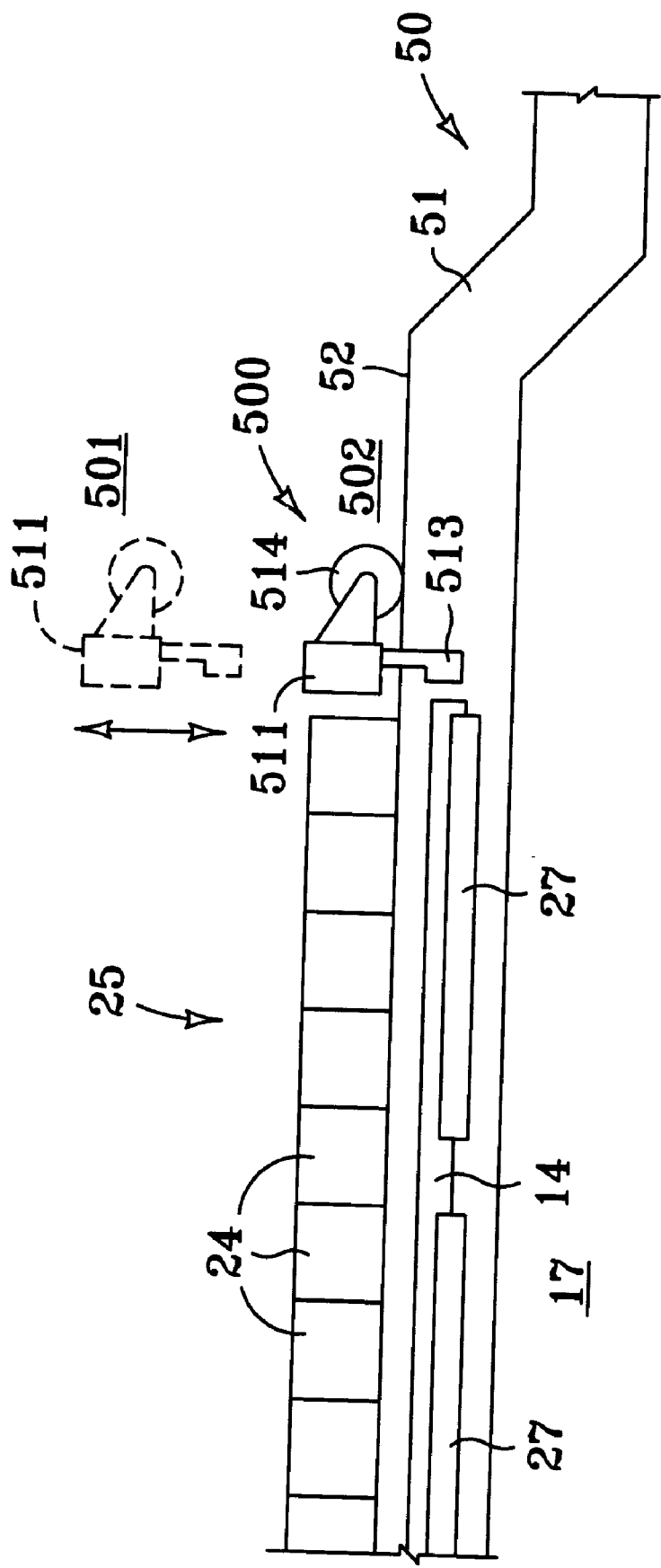
FIG. 11 is a side view of the rake-off device in accordance with one embodiment of the present invention.

Turning now to FIG. 11, an end view of the overhead rake-off device 500 of the present invention, having been briefly described above with respect to FIG. 1, is shown in FIG. 11 at a stacking station 17, along with a side view of the fork assembly 50 which comprises a fork arm 51, having supported thereon a lumber course 25 comprising a plurality of lumber pieces 24, and a sticker 14 that is supported on the sticker tray 27. The rake-off device 500, as is seen from a study of FIG. 11, is configured to be lowered from a clear position 501 (in which the rake-off device is further indicated by phantom lines) to a strip position 502 in which the rake-off device is employed to strip the sticker 14 from the sticker tray 27 in conjunction with retraction of the fork assembly 50 from the stacking station 17.

The rake-off device 500 preferably comprises an elongated, horizontal rake-off bar 511 that is preferably operatively connected to a selectively controllable actuating mechanism (not shown) which is configured to move the rake-off device between the clear position 501 and the strip position 502 in synchronization with the retraction of the fork assembly 50 from the stacking station. Such actuating mechanisms also provide stabilization and horizontal guidance of the rake-off device 500. It is understood that such actuating mechanisms that are typically employed to move rake-off devices between the clear position and strip position are well known and need not be discussed or shown herein.

The rake-off device 500 preferably comprises at least one stripping element 513 which is supported by the rake-off bar 511 and which is configured to contact a respective sticker 14 for stripping the sticker from the respective sticker tray 27 when the rake-off device 500 is in the strip position 501. The rake-off device 500 also preferably comprises at least one roller 514 that is operatively supported by the rake-off bar 511 and that is configured to contact, and roll upon, the upper surface 52 of the fork arm 51 when the rake-off device 500 is in the strip position 501. Preferably, at least a portion of the weight of the rake-off device 500 is borne by the roller 514 upon the upper surface 52 when the rake-off device is lowered into the strip position 501.

In operation, the fork assembly 50, while having supported thereon a lumber course 25, moves into the stacking station 17 and comes to rest temporarily. While the fork assembly 50 is at rest, the rake-off assembly 500 is synchronously lowered form the clear position 501 to the strip position 502 wherein the roller 514 operatively contacts the upper surface 52 of the respective fork arm 51. The fork assembly 50 is then retracted from the stacking station by movement thereof in the general direction from whence it entered the stacking station, while the rake-off device 500 remains substantially stationary at the stacking station and in the lowered strip position 502.

As the result of the retraction of the fork assembly 50 from the stacking station 17 while the rake-off device 500 is in the strip position 502, the stripping surface 513 contacts the respective sticker 14 and causes the sticker to be stripped from the associated sticker tray 27. It is understood that the lumber course 25 can also be stripped from the upper surface 52 of the fork arm 51 in a similar manner. However, it is also understood that the lumber course can, in the alternative, be stripped from the fork assembly 50 by other means which are not shown nor discussed herein.

It is seen from the above discussion in conjunction with an examination of FIG. 11 that the roller 514 of the present invention, while being caused to roll upon the upper surface 52 of the respective fork arm 51 to support at least a portion of the weight thereon of the rake-off device 500, can facilitate substantial vertical alignment and guidance of the stripping element 513 relative to the sticker tray 27 during retraction of the fork assembly from the stacking station 17.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A sticker placing apparatus for use with a lumber stacking apparatus that has a sticker in-feed conveyor and a fork arm with a sticker tray connected thereto, the sticker placing apparatus comprising:
   a base;
   an actuating assembly operatively supported by the base; and,
   a sticker support bracket operatively connected to the actuating assembly, wherein the actuating assembly is configured to move the sticker support bracket upwardly in a substantially vertical direction from a first position to a second position, wherein during such movement from the first position to the second position the sticker support bracket contacts the sticker, thereby lifting the sticker from the sticker in-feed conveyor, and wherein the actuating assembly is further configured to:

move the sticker support bracket substantially horizontally from the second position to a third position, wherein the sticker is substantially above the sticker tray;

move the sticker support bracket downwardly in a substantially vertical direction from the third position to a fourth position, wherein during such movement of the sticker support bracket from the third position to the fourth position, the sticker is deposited on the sticker tray and is released from the sticker support bracket;

move the sticker support bracket upwardly in a substantially vertical direction from the fourth position to the third position, wherein during such movement from the fourth position to the third position, the sticker support bracket contacts the sticker, thereby lifting the sticker from the sticker tray; and, move the sticker support bracket substantially horizontally from the third position to the second position, whereby the sticker is supported on the sticker support bracket in the second position.

2. The sticker placing apparatus of claim 1, and wherein the actuating assembly is further configured to move the sticker support bracket downwardly in a substantially vertical direction from the second position to the first position, wherein during such movement of the sticker support bracket from the second position to the first position, the sticker is deposited on the sticker in-feed conveyor and is released from the sticker support bracket.

* * * * *